March 24, 1970    R. WATTS, JR., ET AL    3,501,886

FILM PACKAGING MACHINE AND METHOD

Filed Sept. 18, 1967    3 Sheets-Sheet 1

INVENTORS
RIDLEY WATTS JR.
ANTON Z. ZUPANCIC
BY
Watts, Hoffmann, Fisher & Heinke
ATTORNEYS.

March 24, 1970   R. WATTS, JR., ET AL   3,501,886

FILM PACKAGING MACHINE AND METHOD

Filed Sept. 18, 1967   3 Sheets-Sheet 2

INVENTORS
RIDLEY WATTS JR.
ANTON Z. ZUPANCIC
BY
Watts, Hoffmann, Fisher & Heinke
ATTORNEYS.

March 24, 1970    R. WATTS, JR., ET AL    3,501,886
FILM PACKAGING MACHINE AND METHOD
Filed Sept. 18, 1967    3 Sheets-Sheet 3

INVENTORS
RIDLEY WATTS JR.
ANTON Z. ZUPANCIC
BY
Watts, Hoffmann, Fisher & Heinke
ATTORNEYS.

United States Patent Office 3,501,886
Patented Mar. 24, 1970

3,501,886
FILM PACKAGING MACHINE AND METHOD
Ridley Watts, Jr., and Anton Z. Zupancic, Cleveland, Ohio, assignors to The American Packaging Corporation
Filed Sept. 18, 1967, Ser. No. 668,372
Int. Cl. B65b *31/00*
U.S. Cl. 53—22                    13 Claims

ABSTRACT OF THE DISCLOSURE

A film packaging machine having a cantilevered film holding frame and heater. The heater uses a rapid heating, low mass ribbon element and is cooled to ambient temperatures between packaging cycles.

BACKGROUND OF THE INVENTION

Field of the invention

This invention relates to improved apparatus and methods for film packaging or so-called skin packaging.

Description of the prior art

Film or skin packaging machines are used to heat a film or sheet of thermoplastic material, such as polyethylene or the like, and apply the film or sheet over an object on a supporting panel to cover the object and retain it on the panel. A typical machine has a perforated table or platen on which the supporting panel is placed, with the object to be packaged resting upon the panel. This panel may be a card made of air pervious fiberboard and the upper surface of the card is often provided with a perforated or pervious plastic surface. A sheet or web of thermoplastic material is clamped in a frame above the platen and heated to soften the sheet. The heated sheet in softened condition is then placed upon the object on the supporting panel and suction is applied through the platen and supporting panel to draw and form the sheet about the object and to bond the sheet to the panel in regions generally surrounding the object.

Typically, such packaging machines are relatively large and expensive, and therefore, are not economically suitable for purposes in which they receive only infrequent or intermittent use. In addition, present machines are relatively inflexible in facilitating the loading of articles and the supplying of plastic film from different sides of the machine and therefore it is sometimes difficult to conveniently locate the machine in a position compatible with existing layouts or to fit it into existing production lines.

Conventional heating units of film packaging machines typically use heating elements such as tungsten-quartz rods, which require a substantial heat-up time and radiate energy of a relatively low wavelength to which thermoplastic materials such as polyethylene are extremely transparent. Low voltages can sometimes be applied to change the wavelength of the radiation emitted by such heaters, but the efficiency of the heater drops at a disproportionate rate, resulting in higher operating costs. During operation of these machines there is a gradual increase in the temperature of the machine and the immediately surrounding environment. As a result, the cycling time during which the thermoplastic film is heated must be continuously reduced until an equilibrium condition is attained. This characteristic is extremely disadvantageous if present in a machine that is to be operated intermittently and for short periods of time and especially if under the control of operators who may be relatively unskilled in the packaging operation.

SUMMARY OF THE INVENTION

The apparatus of this invention provides a film packaging machine having an instantaneously heating, low mass oven or heater, which is coolable to ambient temperatures between heating cycles even during continuous operation to stabilize cycle settings during operation. A ribbon shaped heating element provides large areas of heating surface of low mass. This ribbon gives higher surface temperatures than conventional rod type heaters and the low mass assures rapid cooling once the heating cycle is terminated. In addition, the ribbon radiates energy of a longer wavelength than conventional rod type heaters. This energy is more readily absorbed by the thermoplastic film being heated.

A blower is provided in conjunction with the heater and in the preferred mode of operation is operated continuously; that is, while the heater is on as well as when it is turned off. During a heating portion of the cycle, the blower circulates air through the heating elements and creates a turbulent flow of air adjacent an upper surface of a sheet of thermoplastic material being heated. This turbulent flow enhances the convective transfer of heat to the film. In addition, the blower is located with an intake below and in the general area of the heating elements so that the air circulated while the heater is turned on is relatively warm to begin with and is further heated during circulation. At the conclusion of the heating cycle, when the heating elements are de-energized, the blower continues to circulate air, cooling the heaters and associated structure. Because of the relatively low mass of the heating elements and surrounding structure, the temperature is quickly reduced to the ambient temperature and there is no progressive accumulation of heat for which compensation in the heating cycle is required.

Flexibility of operation and convenience in handling the products to be packaged and the materials used in the packaging process is attained with the present invention by a novel cantilevered construction. Both the heater structure and a vertically movable frame for carrying film between a position adjacent the heater and a position over a vacuum platen are supported in cantilevered fashion from a pair of upright supports. These upright supports are adjacent and offset from, i.e., spaced behind, one edge of the vacuum platen and are spaced apart so as to be located beyond two opposite side edges of the vacuum platen. The space between the upright supports is unobstructed and as a result objects to be packaged or the film and panels can be moved into the machine and over the platen from any of four directions without interference from structural members. In addition, upright members are only located behind, i.e., along one edge of, the vacuum platen so there is no obstruction to the operator that interferes with the handling of packaging materials or products. This construction significantly minimizes the difficulty in locating the machine where it is convenient to use and where it will accommodate the handling of articles to be packaged and packaging materials.

An important safety feature is facilitated by the cantilevered construction of the film supporting frame. The rear edge of the generally horizontal support frame for the film is pivotally supported by carriages movable vertically along the upright supports. The pivotal connection is constructed to limit downward pivoting of the frame to a horizontally extending position, and yet to permit the front or cantilevered end of the frame to freely pivot upward. As a result, when the frame is lowered, if the operator obstructs the downward movement of the frame or if an article being packaged is improperly placed, the frame will not be driven down against the obstruction with the full force of the frame drive mechanism. Rather, it will pivot upward while the rear or attached portion of the frame continues in its downward movement. With this construction, then, the weight of the frame applies the film against the articles during the packaging operation and the drive mechanism that moves the frame serves only to lift the frame and control the rate of downward movement.

The constructional and operational features of this invention provide a compact, portable, film packaging machine that is inexpensive and suitable for use by relatively unskilled personnel. It is ideally adapted to the small retail establishment or for use at various locations in larger establishments, such as in warerooms or at different locations along production lines where it may be desirable to temporarily package loose parts for protection or to prevent loss.

Accordingly, it is an object of this invention to provide a relatively inexpensive and portable film packaging machine that is simple and safe to operate and which readily accommodates a flow of materials and supplies to the machine in any of four directions and which operates on an essentially uniform time cycle regardless of whether the use is intermittent or continual. It is a further object to provide improved methods of packaging objects with thermoplastic film so that the cycling time can be maintained constant. These and other objects, features and advantages of the invention will become more apparent as the invention becomes better understood by reference to the detailed description which follows, when considered in conjunction with the accompanying drawings.

DESCRIPTION OF A PREFERRED EMBODIMENT

Figure 1:
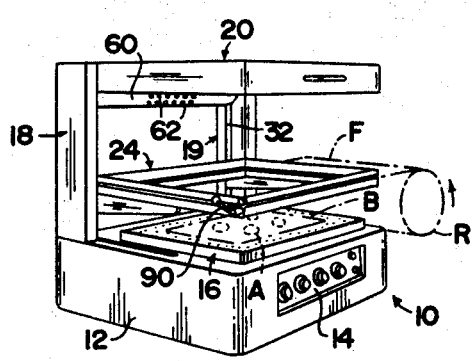
FIGURE 1 is a perspective view of a film packaging machine embodying the present invention.
Figure 2:
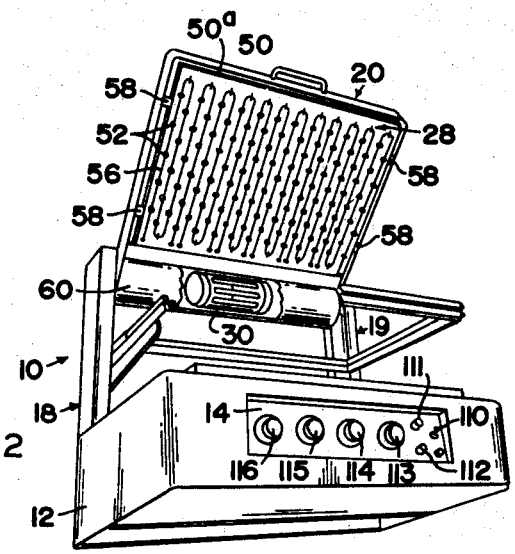
FIGURE 2 is a perspective view of the film packaging machine of FIGURE 1 taken from a slightly different angle and with a heater raised out of operative position.
Figure 3:
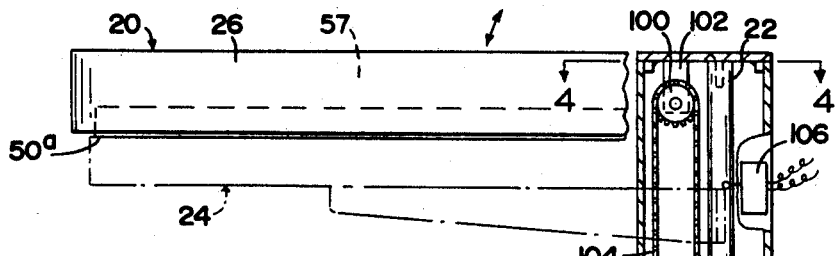
FIGURE 3 is a side elevational view of the machine of FIGURE 1, with parts removed and parts in section, illustrating details of the construction.
Figure 3:
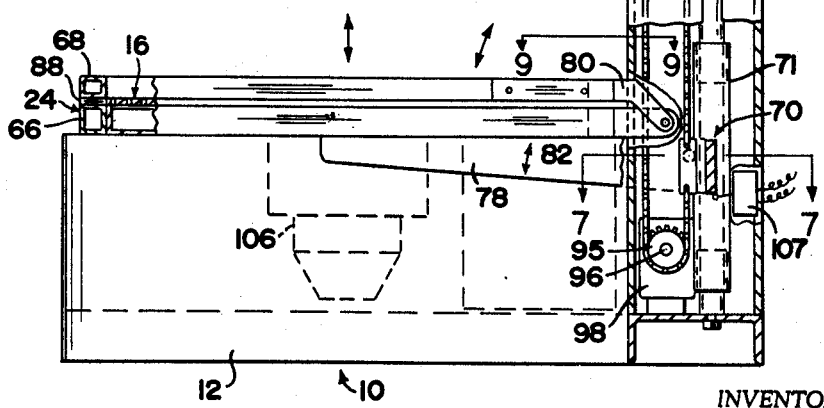

Referring now to FIGURES 1 to 3 of the drawings, a compact, portable film packaging machine 10 is shown, which is adapted to be supported on a table or stand. The machine 10 has a generally rectangular base 12 with a control panel 14 on a front surface of the base. A generally rectangular vacuum platen 16 is supported on the base 12 and in use supports a panel or supporting board B on which articles A to be packaged are placed. Two spaced upright support columns 18, 19 extend upwardly from two rear corners of the base 12. A heating unit 20 is supported by the two support columns 18, 19 and extends forwardly therefrom in cantilevered fashion spaced above the base 12 and vacuum platen 16. Two identical vertical support posts, one of which is shown at 22 in FIGURE 3, extend within the support columns 18, 19. A vertically movable film support frame 24 extends forwardly from said support posts 22 in cantilevered fashion, normally parallel with the base 12, vacuum platen 16, and heating unit 20. A roll R of thermoplastic film F is shown in FIGURE 1 in phantom, illustrating the manner in which a supply of film can be associated with the machine 10 to supply film from one side of the machine. The roll R can equally well be located on the opposite side of the machine or directly behind the support columns 18, 19 so that the film passes between the support columns to the vertically movable support frame 24.

Figure 4:
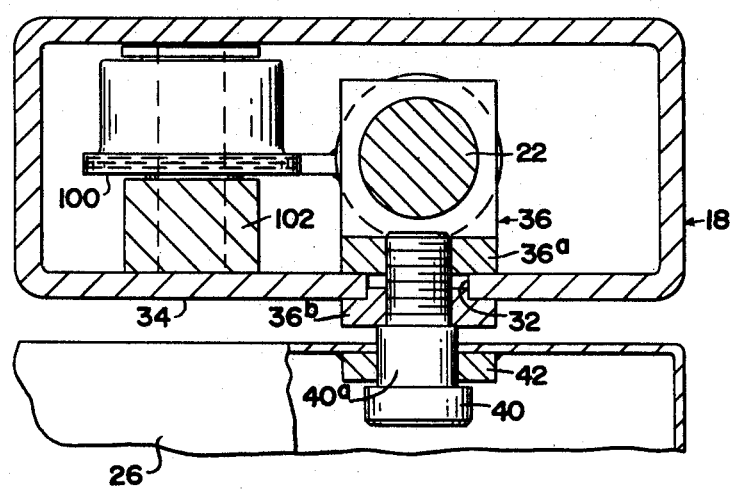
FIGURE 4 is a sectional view of a support member of the machine, taken along the line 4—4 of FIGURE 3 and looking in the direction of the arrows, illustrating details of a pivotal connection between an upright support and the heater.
Figure 5:
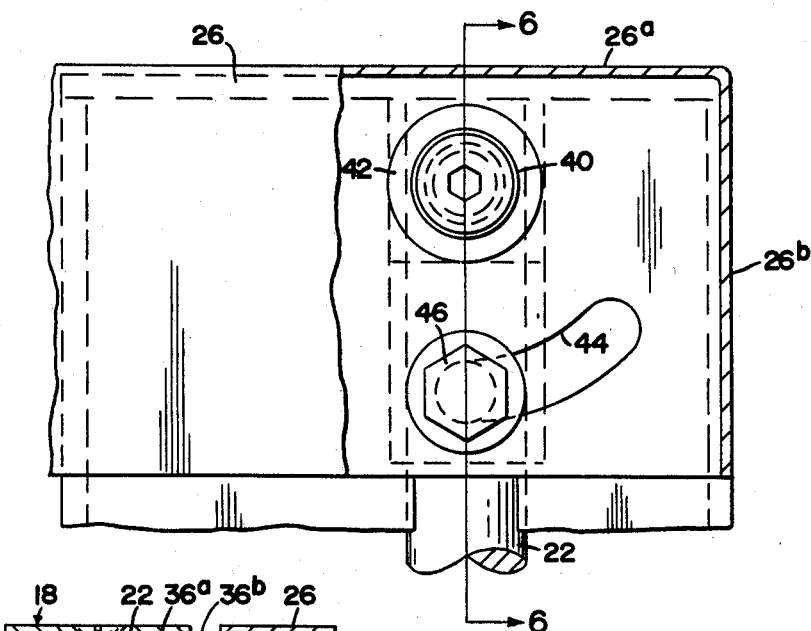
FIGURE 5 is a side elevational view, with parts removed and parts in section, further illustrating the pivotal connection shown in FIGURE 4.
Figure 6:
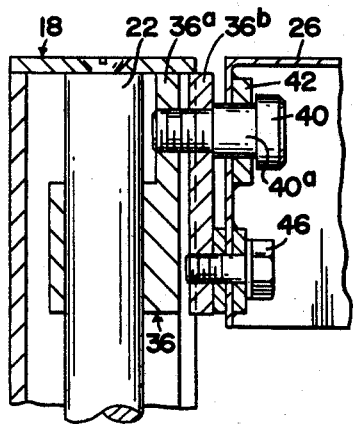
FIGURE 6 is a sectional view of the pivotal connection of FIGURE 5, taken along the line 6—6 of FIGURE 5 and looking in the direction of the arrows.

The assembly forming the heating unit 20 is best shown in FIGURE 2 of the drawings, and details of construction are illustrated in FIGURES 4 to 6. The heating unit 20 includes a rectangular hood 26 and a rectangular oven 28 carried beneath and surrounded by the hood 26. A blower and motor unit 30 at the rear of the oven 28 and hood 26 also forms a part of the heating unit. The hood 26 has a top surface 26a and a peripheral depending flange 26b. The hood is supported by support columns 18, 19 for vertical adjustment and pivotal movement relative to the base 12.

Each of the columns 18, 19 that support the hood are of tubular construction, rectangular in cross section. The columns 18, 19 each surround a support post 22. The ends of the tubular wall forming each of the columns form a vertical slot 32 along a flat vertical surface 34 of the columns that faces inwardly of the machine. See FIGURE 4.

A clamp bracket 36 formed of an inner part 36a and an outer part 36b is movable vertically along and guided by the slot 32 of each column 18, 19 to provide an adjustable support for opposite sides of the hood 26. The inner part 36a of each bracket 36 is slidably carried by a vertical support post 22 and abuts the inside of the associated tubular support column, in a position across the slot 32. The outer part 36b of the bracket 36 is T-shaped in cross section and fits partially within the associated slot 32, with the remaining part in contact with the inside facing surface 34 of the support column. The outer part 36b serves to clamp the bracket 36 in adjusted position along the column 18 or 19. Clamping is accomplished by a headed stub shaft 40 that is threadedly received in the bracket parts 36a, 36b. The stub shaft 40 has a bearing portion 40a that passes through a reinforcing plate 42 on the inside of the peripheral flange 26b of the hood, adjacent a rear corner of the hood, and pivotally connects the hood to the adjacent column. A similar stub shaft and related structure is provided on the opposite side of the hood 26 so that the hood is supported adjacent the two rear corners of the hood.

An arcuate slot 44 is formed in the peripheral flange 26b beneath the reinforcing plate 42 on each side of the hood. A clamping bolt 46 passes through the slot 44 and is threadedly received in the adjacent bracket 36. The clamping bolt 46 and slot 44 restrict pivotal movement of the hood 26 about the stub shafts 40, preventing the hood from pivoting downward past the horizontal while permitting limited upward pivotal movement for access to the oven 28.

Figure 10:
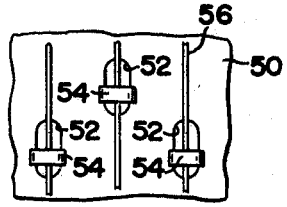
FIGURE 10 is a partial bottom plan view on an enlarged scale of a heating element sub-assembly of the heater shown in FIGURE 2, illustrating the heating element and constructional features.

The oven 28 is formed of a heating element support plate 50 (see FIGURES 2 and 10) that has a peripherally depending flange 50a. Apertures 52 are provided in the plate 50 to receive supporting ends of insulators 54 and to provide passageways through the plate 50 for air circulation. A ribbon shaped electrical resistance heating element 56 is supported below the lower surface of the plate 50 by the insulators 54. The ribbon heating element 56 extends in a back and forth path, as shown in FIGURE 2 of the drawings. The heating element 56 is quite thin and therefore provides a large radiating surface with a low mass, so that it quickly reaches a high temperature when energized and quickly cools when the electric current to the heating element is turned off.

The oven 28 fits within the hood 26 and is spaced below the top wall 26a of the hood so that a plenum chamber 57 is provided between the hood 26 and the oven 28. The oven is secured in this position within the hood 26 by suitable brackets 58, shown in FIGURE 2.

A partially cylindrical blower housing 60 extends across the back of the hood 26, forming an enclosure with the back of the hood, behind the oven 28. The blower housing 60 is perforated to provide openings 62 (see FIGURE 1) that serve as air inlets to the blower housing. A housing outlet (not shown) opens into the plenum chamber formed between the oven 28 and hood 26. The blower and electric motor unit 30 are located within the housing 60. When the motor is operated the blower draws air from beneath the oven 28 and introduces the air under pressure to the plenum chamber 57 between the hood and the oven. From the plenum chamber the air flows through the openings 52 in the heating element support plate 50, past the heating elements, to a zone directly beneath the oven and hood. This flow aids in heating film for the packaging operation and cools the heating unit between heating cycles.

Figure 7:
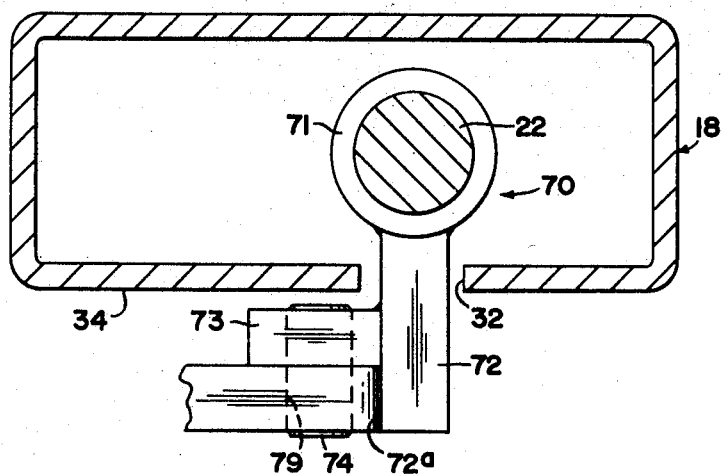
FIGURE 7 is a sectional view taken along the line 7—7 of FIGURE 3 and looking in the direction of the arrows, showing the connection of the film supporting frame with the upright supports.
Figure 8:
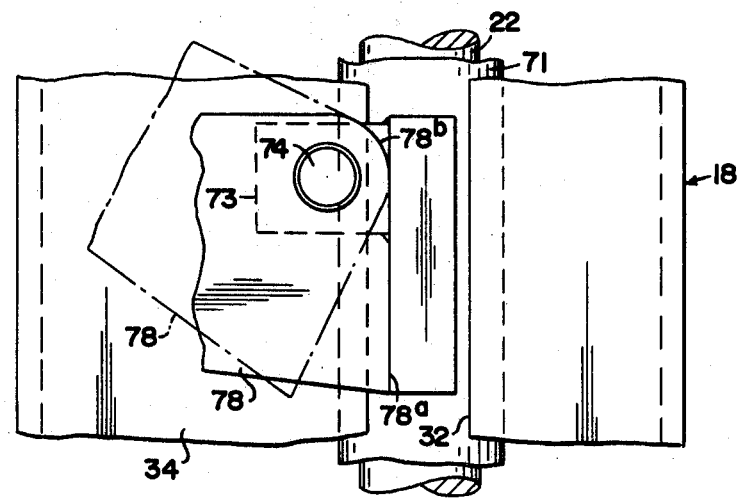
FIGURE 8 is a side elevational view of the connection shown in FIGURE 7 of the drawings.

The film support frame 24 is supported by the support posts 22 for vertical movement from a lower position shown in solid lines in FIGURE 3 of the drawings to an upper position indicated in phantom in FIGURE 3. The frame 24 is generally rectangular in shape and is of a size to closely surround the vacuum platen 16. It includes two frame members, a lower film supporting member 66 and an upper, overlying, clamping member 68. Both members 66, 68 are preferably of tubular construction to minimize the weight while retaining adequate strength and rigidity. The lower member 66, as shown in FIGURES 3, 7 and 8, is attached to carriages 70 at opposite sides adjacent rear corners of the frame and extends forward in cantilevered fashion over the base 12 of the packaging machine 10. Each carriage 70 is within a column 18, 19 and has a tubular portion 71 that slides on the post 22 within the column. Each carriage 70 also includes a bracket portion 72 (see FIGURE 7) extending from the tubular portion 71, through the slot 32 of the column. The bracket portion 72 includes a flat forward facing surface 72a that functions as a rear abutment plate for the support frame 24. A lug 73 extends perpendicularly from the front surface 72a of the bracket portion 72. A pivot pin 74 extends from the lug 73 and pivotally supports the film support frame 24. The construction on both sides of the frame is similar. The pivot pin 74 from each carriage extends transversely of the upright support columns 18, 19 and provides a pivot axis for the film support frame parallel to the back edge of the frame.

The lower film supporting member 66 of the frame 24 is connected to an arm extension 78 directly below the lower member 66 on opposite sides of the frame 24. The arm extension 78 extends rearwardly of the frame, where it is pivotally secured to the carriage 70 of each upright support column 18, 19 by the pivot pin 74. The pivot pin 74 passes through an aperture 79 in an upper rear portion of the arm extension 78. A flat back surface 78a is provided on the arm extension 78 and this surface cooperates with the front surface 72a of the bracket 72 to limit downward pivoting of the arm extension 78 and frame 24 about the pivot support 74. A curved edge surface 78b of the arm extension 78 above the aperture 79 provides clearance between the arm extension and the front surface 72a of the bracket portion 72 so that the entire frame 24 can pivot upwardly about the pivot pins 74. With this arrangement, the weight of the frame 24 holds the frame in a horizontal position with the surface 78a abutting the surface 72a. This is the normal position in which the frame 24 is maintained as it moves vertically with the carriages 70. However, during downward movement of the carriages 70 and frame 24, the frame 24 can pivot upwardly about the pivot pins 74 in the event an obstruction is in the path of the frame 24. Thus, only the weight and momentum of the frame 24 will act upon an obstruction in its path, and not the power applied by the movement of the carriages 70. Slots, one of which is shown at 81 in FIGURE 1, are provided in the base 12 in alignment with the arm extensions 78 to facilitate downward movement of the frame 24 to the lowered position shown in FIGURE 3.

Figure 9:
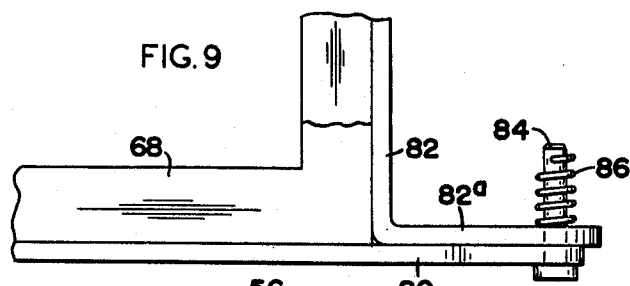
FIGURE 9 is a top partial plan view of the film supporting frame of FIGURE 3, taken along the line 9—9 of FIGURE 3 and looking in the direction of the arrows, showing the manner in which an upper clamping member of the film supporting frame is pivotally connected and spring biased relative to a lower film supporting member of the frame.

A connecting arm 80 is attached to each side of the upper frame member 68 and extends rearwardly beyond the back edge of the frame and downward to the level of the lower frame member 66. Each connecting arm 80 is pivotally connected to a rearwardly extending leg 82a of an angle bracket 82 (see FIGURE 9) on the back edge of the lower frame member 66. A pivot pin 84 extends through the rearwardly extending arm 80 and rearwardly extending leg 82a to pivotally connect the upper frame member 68 to the lower frame member 66. A coil spring 86 encircles the pin 84 and biases the upper frame member 68 to a downward, clamping position.

As best shown in FIGURE 3, a compressible sealing gasket 88 is positioned between the two frame members 66, 68 and is carried by one of the frame members, in this instance the lower frame member. In addition, a latching mechanism 90 (see FIGURE 1) associated with the upper and lower frame members holds the two frame members securely together during operation. The latch mechanism 90 may constitute a magnetic latch, as shown, or a mechanical latch.

The drive mechanism for moving the film support frame 24 vertically between upper and lower positions is best shown in FIGURE 3 of the drawings. The construction of the carriage and drive for moving the frame on each side of the machine is essentially identical.

A lower drive sprocket 95 is located in each upright column 18, 19 within the base 12 and is fixed to one end of a drive shaft 96 that extends within and across the back of the base 12. The drive shaft 96 is driven by a reversible electric drive unit 98 in the base 12.

An upper idler sprocket 100 is provided in each column support 18, 19, vertically aligned with the associated lower drive sprocket 95 and supported by a bracket 102 fastened to the respective column support. Both sprockets 95, 100 in each column are forward of the support posts 22 along which the carriages 70 reciprocate.

A drive chain 104 in each column extends around the two sprockets 95, 100 and opposite ends of the chain are connected to the associated carriage 70, as best shown in FIGURE 3. Rotation of the drive shaft 96 and the drive sprocket 95 drives the chain 104 in either of two directions. This reciprocates the carriages 70 in each supporting column 18, 19 vertically upward or downward along the support posts 22. The upper and lower limits of travel of the carriages 70 are controlled by limit switches 106, 107 mounted on the inside facing surface 34 of the support column 18. The limits of the frame travel can be adjusted by varying the position of the limit switches 106, 107.

Controls for the operation of the machine 10, as well as a blower 106 for creating a vacuum for the vacuum platen 16 are housed within the base 12. Operation is controlled from the control panel 14 on the front of the base 12. The controls (see FIGURE 2) include a power "on-off" switch 110, a "frame-up" switch 111, a "cycle start" switch 112, a "vacuum adjust" dial 113 for controlling the evacuation of the vacuum platen 16, a "vacuum timer" control 114 to control the time during which the vacuum operates during the machine cycle, a "heat-hold" or overlap heater control 115, which selectively allows heat to be maintained after the frame has been lowered to aid in adhering the film to the surface of the article supporting panel, and a "heater control" 116.

In operation, film is loaded into the film support frame 24, supported on the lower frame member 66 and is clamped firmly in place by the upper member 68. Preferably, this film is supplied from a roll R and remains connected to the roll during the packaging operation so that when the finished package is removed, it will draw a new film portion into proper position with respect to the frame 24. After the film is clamped in place the operator closes the "frame-up" switch 111 to raise the frame 24 into the upper position beneath the oven 28, as shown in phantom in FIGURE 3. The upper frame level is determined by the location of limit switch 106 and preferably it is raised to a position in which the upper frame member 68 contacts the depending flange 50a of the heating element support plate 50 providing a heating enclosure above the film and enhancing convective transfer of heat to the film.

A supporting panel is then placed on the vacuum platen 16 and articles to be packaged are placed upon the panel. The operator then closes the cycle start switch 112. This starts the blower unit 30 and causes the oven 28 to heat for a predetermined time, as controlled by a timer. When the timer times out, the frame 24 automatically lowers. The frame is lowered by operation of the drive unit 98 in a direction to drive the carriages 70 from the upper position shown in phantom in FIGURE 3 to the lower position shown in solid line in FIGURE 3. Simultaneously, the vacuum blower 106 is energized to withdraw air from the area immediately above the vacuum platen 16. The heated sheet of plastic film is lowered over the articles on the panel and the film is drawn down about the objects and into firm contact with the upper surface of the panel by the vacuum applied through the vacuum platen 16. The vacuum remains on for a predetermined period of time, and then stops, indicating the end of a machine cycle. At the same time the blower unit 30, which has been operating continuously, is also turned off. The frame 24 is then manually opened by raising the upper frame member 68 and the package is removed from the frame 24, at the same time drawing in a new portion of film if the film is part of a continuous web or roll. The frame is again closed to clamp a new film portion in the frame and the finished package is severed from a following film portion.

In some instances, a tight seal between the article supporting panel and the thermoplastic film is enhanced if the application of heat is continued while the vacuum forms the package. The "heat-hold" control 115 can be set to retain the heater energized after the heater timer has timed out and the frame moved to the lower position to accomplish this.

In a typical operation, the heating elements reach an operating temperature of approximately 1700° Fahrenheit in about 4 to 6 seconds and are cooled to ambient temperatures by the blower unit 30 after the heater is turned off in from 6 to 8 seconds.

In an alternative mode of operation, the blower unit 30 can be used only to cool the heater by cycling the blower to operate only when the heater is turned off.

By way of example, four ribbon type heating elements are utilized in the preferred embodiment described above and are connected with input leads from a current source of 208 volts and operate at 30 amperes, or 6240 watts. A cycle time as low as 30 seconds can be attained using four mil polyethylene as the packaging film, in which instance the heating cycle is approximately 12 to 15 seconds. Between the time in which the heaters operate during successive cycles, the blower unit 30 circulates air to reduce the temperature of the oven, adjacent machine parts and surrounding atmosphere to ambient so that there is no build up of heat and the heating cycle time can be maintained constant.

While a preferred embodiment of this invention has been described in detail, it will be readily apparent that various modifications or alterations may be made therein without departing from the spirit and scope of the invention, as set forth in the appended claims.

What is claimed is:

1. Packaging apparatus comprising: a base; a stationary vacuum platen supported on said base; a pair of upright supports adjacent but offset from one edge of the vacuum platen, spaced apart and located beyond two opposite side edges of the vacuum platen; a heater supported over the vacuum platen by and cantilevered from said upright supports, said heater being secured to said upright supports for pivotal movement upward relative to said supports from a generally horizontal operative position; a frame for supporting a film or the like, said frame supported by and cantilevered from a pair of upright supports adjacent but offset from one edge of the vacuum platen, spaced apart and located beyond two opposite side edges of the vacuum platen, said frame extending over and generally parallel to said vacuum platen and movable vertically relative to the base between a lower position adjacent the vacuum platen and an upper position beneath and adjacent said heater; an essentially unobstructed open space between upright supports on opposite sides of the vacuum platen extending at least the distance between the said two opposite side edges of the vacuum platen; and means to move the film supporting frame vertically between said upper and lower positions.

2. Packaging apparatus comprising: a base; a stationary vacuum platen supported on said base; a pair of upright supports adjacent but offset from one edge of the vacuum platen, spaced apart and located beyond two opposite side edges of the vacuum platen; a heater supported over the vacuum platen by and cantilevered from said upright supports; a frame for supporting a film or the like, said frame supported by and cantilevered from a pair of upright supports adjacent but offset from one edge of the vacuum platen, spaced apart and located beyond two opposite side edges of the vacuum platen, said frame extending over and generally parallel to said vacuum platen, pivotally supported relative to said upright supports for movement upward from a horizontal position to an inclined position, and movable vertically relative to the base between a lower position adjacent the vacuum platen and an upper position beneath and adjacent said heater; an essentially unobstructed open space between upright supports on opposite sides of the vacuum platen extending at least the distance between the said two opposite side edges of the vacuum platen; and means to move the film supporting frame vertically between said upper and lower positions.

3. Apparatus as set forth in claim 2 wherein the frame includes a lower film supporting member and an upper film clamping member mounted for movement relative to said film supporting member.

4. Apparatus as set forth in claim 1 including a blower associated with said heater operable while said heater is energized.

5. Apparatus as set forth in claim 1 wherein said heater includes a low mass heating element in the form of a ribbon that emits relatively long wave radiation when energized.

6. Packaging apparatus comprising a base; a vacuum platen supported by said base; a heater supported above the base spaced from the vacuum platen; a pair of upright supports adjacent to said vacuum plate; a frame for supporting a film of thermoplastic material, said frame extending over said vacuum platen; means securing said frame to said upright supports in cantilevered fashion for vertical reciprocating movement relative to said vacuum platen, said means including a pivot connection to said frame and an abutment surface, said pivot connection permitting upward swinging of said frame relative to the vacuum platen and said abutment surface preventing downward swinging of said frame below a horizontal position, whereby the frame will swing upward if its path is obstructed during downward movement.

7. Apparatus as set forth in claim 6 wherein the frame includes a lower film supporting member directly pivoted to said securing means and an upper film clamping member mounted for movement relative to said film supporting member.

8. In a method of film packaging, the steps comprising supporting a thermoplastic film in a generally horizontal orientation beneath a heater, relatively moving the film and heater into adjacent relationship, supporting an article on a vacuum platen beneath the film, heating the film by energizing the heater for a predetermined time and increasing heat transfer to the film by concurrently blowing air to create a plenum of air above the film and to circulate air about the heater and an adjacent surface of the film, thereafter terminating energization of the heater and reducing the temperature of the heater and environment adjacent the sheet to substantially ambient temperature by continuing to blow and circulate air about the heater, whereby each heating cycle remains substantially uniform in time and temperature, and relatively moving the film and vacuum platen into adjacent relationship so that the film overlies the article on the vacuum platen, and applying a vacuum to said vacuum platen to draw the film tightly over the article on the platen.

9. Packaging apparatus comprising: a base; a stationary vacuum platen supported on said base; a pair of upright supports adjacent but offset from one edge of the vacuum platen, spaced apart and located beyond two opposite side edges of the vacuum platen; a heater supported over the vacuum platen by and cantilevered from said upright supports; a plenum chamber above the heater with outlets communicating with a zone heated by said heater; a blower for pressurizing said plenum chamber and being operable while said heater is energized; a frame for supporting a film or the like, said frame supported by and cantilevered from a pair of upright supports adjacent but offset from one edge of the vacuum platen, spaced apart and located beyond two opposite side edges of the vacuum platen, said frame extending over and generally parallel to said vacuum platen and movable vertically relative to the base between a lower position adjacent the vacuum platen and an upper position beneath and adjacent said heater; a pivotal connection between said frame and said upright supports and an abutment cooperating with said pivotal connection to prevent downward swinging of said frame below a horizontal position; an essentially unobstructed open space between upright supports on opposite sides of the vacuum platen extending at least the distance between the said two opposite side edges of the vacuum platen; and means to move the film supporting frame vertically between said upper and lower positions.

10. Packaging apparatus comprising a horizontal base; a vacuum platen supported by said base; a heater supported generally horizontally above the base spaced from said vacuum platen; and means carried by said base to support a film and movable between two positions one adjacent the vacuum platen and the other adjacent the heater; said heater comprising a low mass ribbon electrical resistance heating element and a planar perforated support for said heating element, said heating element being located on one side of the support; a plenum chamber on the opposite side of the heating element support from the heating element; and a blower for pressurizing said plenum chamber and forcing air through perforations of said support, said blower having an intake communicating with and adjacent to a zone on the said one side of the support.

11. Packaging apparatus comprising a horizontal base; a vacuum platen supported by said base; a heater supported in cantilever fashion generally horizontally above the base spaced from said vacuum platen and including a perforated, horizontal heating element support extending generally in a plane and a depending rim or flange-like barrier peripherally surrounding the support; a low-mass electrical resistance heating element carried on one side of said support; a plenum chamber on the opposite side of the heating element support; a blower for pressurizing the plenum chamber and forcing air through perforations of said support; means to operate said blower while the heating element is energized and also thereafter to cool the apparatus; and means carried by said base in cantilever fashion to support a film over the vacuum platen and movable between two positions, one adjacent the vacuum platen and the other adjacent the heater, said means comprising a frame that is engageable with the depending rim or flange-like barrier peripherally surrounding the heating element support.

12. Packaging apparatus comprising: a base; a stationary vacuum platen supported on said base; a pair of upright supports, spaced apart and adjacent but offset from one edge of the vacuum platen; a heater supported over the vacuum platen by said upright supports; a frame for supporting a film or the like, said frame supported for vertical movement between a lower position adjacent the vacuum platen and an upper position beneath and adjacent said heater by a pair of spaced upright supports adjacent one edge of the vacuum platen, said frame extending over and generally parallel to said vacuum platen and pivotally supported relative to said upright supports for movement upward from a horizontal position to an inclined position; said base and upright supports providing essentially an unobstructed open space adjacent at least three sides of the vacuum platen; and means to move the film supporting frame vertically between said upper and lower positions.

13. Packaging apparatus comprising: a base; a stationary vacuum platen supported on said base; a pair of upright supports adjacent one edge of the vacuum platen and spaced apart; a heater supported over the vacuum platen by and cantilevered from said upright supports; a frame extending over and generally parallel to said vacuum platen, for supporting a film or the like, said frame being supported in cantilevered fashion from two upright stationary supports secured to said base adjacent one edge of the vacuum platen, and being movable vertically along said upright stationary supports between a lower position adjacent the vacuum platen and an upper position beneath and adjacent said heater, the distance between said platen and said heater, and the height of said two upright stationary supports from which the frame is supported, being substantially greater than the height of said base; and means to move the film supporting frame relative to the upright stationary supports vertically between said upper and lower position, said means including a drive for controlling vertical movement of the frame relative to the two upright stationary supports.

References Cited

UNITED STATES PATENTS 2,690,593 10/1954 Abercrombie.
3,377,770 4/1968 Rorer _____ 53—112

TRAVIS S. McGEHEE, Primary Examiner

U.S. Cl. X.R.

53—112